Aug. 8, 1933.  W. EICHHOLZ ET AL  1,921,312
THERMOSTAT
Filed March 10, 1932
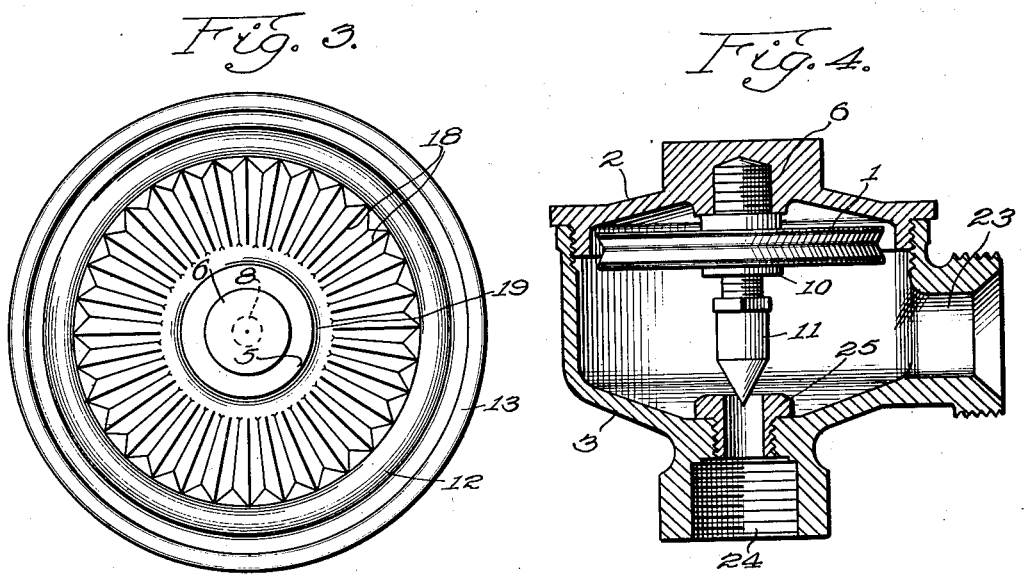

Patented Aug. 8, 1933

1,921,312

UNITED STATES PATENT OFFICE 1,921,312

THERMOSTAT

William Eichholz, Cicero, and Richard W. Leutwiler, Chicago, Ill., assignors to Illinois Engineering Company, Chicago, Ill., a Corporation of Illinois Application March 10, 1932. Serial No. 597,990

5 Claims. (Cl. 297—8)

This invention relates to temperature responsive devices formed of diaphragms connected together to provide a plurality of communicating expansion cells and employed for the operation of valves and other devices such as electrical switches which it is desired to have open and close upon predetermined temperature changes.

The objects of the invention are to provide an improved diaphragm and an improved means for joining the peripheries of pairs of relatively movable diaphragms.

The objects of the invention are attained by means of a construction such as illustrated in the accompanying drawing in which:

Fig. 1 is a transverse vertical section of the improved thermostat and illustrates the thermostat in contracted condition.

Fig. 2 is a transverse vertical sectional view showing the thermostat in expanded condition.

Fig. 3 is a plan view of the construction illustrated by Figs. 1 and 2.

Fig. 4 shows the thermostat in side elevation with its support and housing in section.

The expansion cell type of thermostat to which this invention relates is generally quite satisfactory in withstanding moderate changes in internal and external pressures and to continue to operate satisfactorily after a large number of operations thereof, but with the present improved construction of diaphragm and joining means for the diaphragms, the ability of the instrument to withstand increased changes in pressure and temperature is enhanced and its usefulness is extended.

The principal features of the device, for example when constructed for operating the outlet valve or steam trap of a radiator, are two pairs of diaphragms, the inner adjacent diaphragms being flat to bear against each other throughout their entire areas when the thermostat is contracted and subjected to external pressures; the outer diaphragms of each pair are each provided with an annular pressed out channel or rib near its periphery, giving the diaphragm a peripheral flexing area free from chance of buckling while the area of the diaphragm inside of the annular channel is made rigid by a plurality of radial corrugations not connected with the annular rib; also each cell is formed of one flat diaphragm and one ribbed diaphragm. The ribbed diaphragm outside of the annular flexing channel is bent into trough form for receiving a correspondingly bent peripheral portion of the flat diaphragm and the solder which connects the outer edges of the pair of diaphragms. The metal forming the diaphragm is of a quality and condition which will withstand the forming operations and fairly sharp bends without being unduly weakened, but by means of the joint above specified, all acute angle bends are avoided. The flat diaphragms are centrally perforated and connected together by a ferrule bent over and soldered to the diaphragms.

Referring to the drawing, Fig. 4 illustrates the thermostat as used to function as a temperature responsive trap for a steam radiator. In this case the thermostatic element 1 is supported from the cap 2 of the body 3 of the trap. The upper diaphragm 4 supports a post 5 which is threaded for engagement with a socket 6 in cap 2. This post has an internal bore 7 through which the thermostat may be filled with the operating fluid. A threaded plug 8 is soldered into the bore 7 after the filling operation which takes place under the necessary degree of vacuum required for maximum expansion of the particular fluid employed at the temperature range desired.

The lowermost diaphragm 9 likewise carries a post 10 to which may be attached the operated element such as valve 11.

Diaphragms 4 and 9 are alike, each being radially ribbed or corrugated from near the posts 5 and 10 outwardly to near an annular diaphragm rib 12 pressed outwardly from the diaphragm so as to be concave on one side and convex on the other. The maximum flexing of the diaphragms 4 and 9 takes place at the annular ribs 12 and between these ribs and the bent rims of the diaphragms. The peripheries of these diaphragms are bent into the trough forms 13 and interfit with the bent peripheries 14 of the flat diaphragms 15 and 16. The pairs of diaphragms are tinned along their contacting peripheral portions and are soldered together by the solder 17 in the form of a tapered peripheral ring which renders the pairs of diaphragms rigid along their peripheries. The diaphragms 4 and 9 inwardly from their radial ribs 18 are soldered to the posts 5 and 10 along the flat inner surfaces of the posts and at the meeting corners of the posts and diaphragms as indicated by the solder 19. These diaphragms are also centrally perforated to fit over centering bosses 20 and 21 of the posts.

The operation of the thermostat, as for example in the steam trap illustrated by Fig. 4, is to expand at steam temperatures and seat valve 11 and to hold it seated so long as such temperatures are maintained, but when the thermostat cools, as for example from 116° to 115° the valve is lifted from its seat because of the contraction of fluid carried by the thermostat permitting the device to collapse as indicated in Fig. 1.

When the fluid within the thermostat expands the diaphragms are flexed as indicated in Fig. 2. The bending of the outer diaphragms takes place mainly at the annular ribs 12 and between these ribs and the outer rigid peripheral portions of the diaphragms. These diaphragms also flex somewhat just outwardly of the posts 5 and 10, but the area of the diaphragms carrying the radial ribs is but slightly distorted and buckling does not occur.

The inner diaphragms 15 and 16 are limited in their movement toward each other by engagement along substantially all of their areas except where connected together at their centers and at the peripheries which carry the solder 17. The inner diaphragms being subjected to the same internal pressure and engaging each other as described, can not buckle past the center position. Upon the expansion of the thermostat, the inner diaphragms may flex in an easy curve between the points of attachment at their centers and peripheries.

Although but one specific embodiment of this invention is herein shown and described, it is to be understood that details of the construction shown may be altered or omitted without departing from the spirit of the invention as defined by the following claims.

We claim:

1. An expansion cell thermostat comprising two pairs of diaphragms, each pair of diaphragms having a peripheral connecting joint, and one diaphragm of each pair having a plane surface, said plane surfaced diaphragms being centrally perforated and connected by a ferrule at said perforations, the remaining outer diaphragm of each pair being strengthened against flexure by radial ribs, except just inwardly of the peripheries thereof where the diaphragm is provided with an annular pressed out rib.

2. An expansion cell thermostat comprising two pairs of diaphragms, each pair of diaphragms having a peripheral connecting joint, and one diaphragm of each pair having a plane surface, said plane surfaced diaphragms being centrally perforated and connected by a ferrule at said perforations, the remaining outer diaphragm of each pair being strengthened against flexure by radial ribs, except just inwardly of the peripheries thereof where the diaphragm is provided with an annular pressed out rib, said annular rib being independent of said radial ribs by not merging therewith.

3. An expansion cell thermostat comprising two pairs of diaphragms, each pair of diaphragms having a peripheral connecting joint, and one diaphragm of each pair having a plane surface extending inwardly from said joint, said plane surfaced diaphragms being arranged to bear against each other throughout their plane areas and being centrally perforated and secured together at the edges of said perforations, the remaining diaphragm of each pair having radial ribs and an annular pressed out rib near the periphery not merging with the radial ribs.

4. A thermostat of the expansion cell type comprising a pair of diaphragms centrally supported for movement toward and away from each other, the peripheral portion of one diaphragm being bent into an open channel, the open face of which channel is in a plane parallel with the plane of the diaphragm, the periphery of the other diaphragm being bent to rest in said open channel, and said channel being filled with solder.

5. In an expansion cell device comprising a pair of peripherally connected juxtaposed diaphragms, one of said diaphragms having an annular pressed out rib positioned near its periphery and a plurality of radial ribs occupying the area of said diaphragm within said annular rib, said radial ribs terminating adjacent the inner margin of said annular rib.

WILLIAM EICHHOLZ.
RICHARD W. LEUTWILER.